Nov. 12, 1935.  D. E. ARMSTRONG ET AL  2,020,283
INSECT TRAP
Filed May 10, 1935
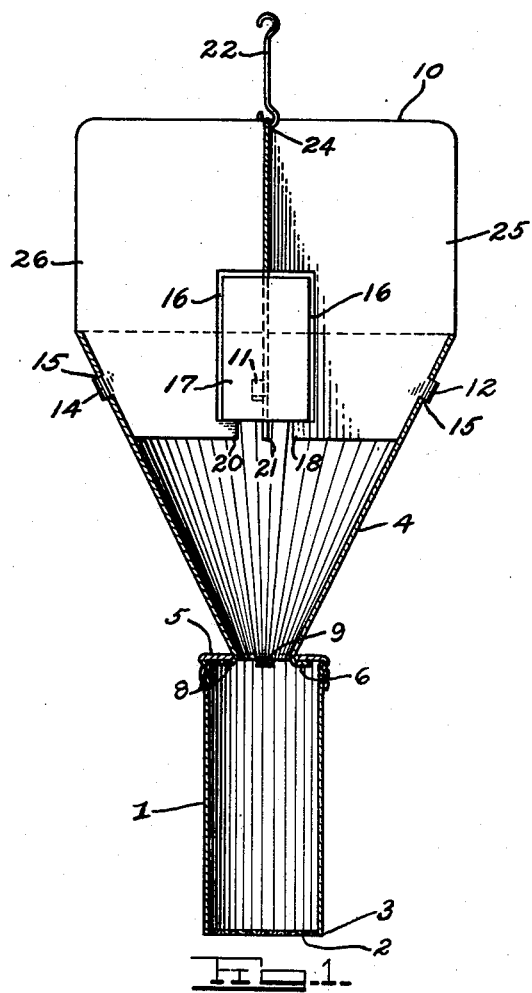
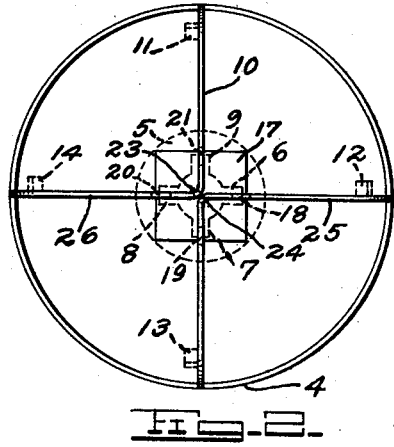
INVENTORS
D.E. ARMSTRONG
F.W. METZGER
ATTORNEYS Patented Nov. 12, 1935

2,020,283

UNITED STATES PATENT OFFICE 2,020,283

INSECT TRAP

Donald E. Armstrong, New Cumberland, Pa., and Frederick W. Metzger, Moorestown, N. J.

Application May 10, 1935, Serial No. 20,784

2 Claims. (Cl. 43—107)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to us of any royalty thereon.

This invention relates to an insect trap and more particularly to improvements in a trap for the Japanese beetle, although insects of numerous other species have been and may be captured and destroyed by our device.

In trapping the Japanese beetle there are several fundamental features which must be embodied in the structure of a device which will be efficient in catching this beetle or other species of insects.

Devices of this nature are described in Letters Patent of the United States No. 1,968,953, dated August 7, 1934, and No. 1,968,954 also dated August 7, 1934.

The traps described in the Letters Patent No. 1,968,953 and No. 1,968,954 are especially adapted for use in areas where the Japanese beetle is present in very large numbers, but they also can be employed where only a few of these insects are known to be present. Their use in areas of isolated or light infestations is considered to be extremely valuable, but householders in such locations have preferred to use smaller and cheaper devices which are not as effective in catching beetles as those described in the Letters Patent mentioned heretofore.

Important features of the traps described in Letters Patent No. 1,968,953 and No. 1,968,954 which are incorporated in our new invention are: The proper length of the funnel or conduit whereby attracted insects are precipitated by gravity into a receptacle from which they can not escape; the small size of the non-effective area in order that a great number of the insects attracted will fly directly to those portions of the trap whereby they may be captured; and proper means whereby a sufficient amount of the bait or attractant can be employed at the most effective location in order to secure the maximum results from such bait.

The object of our present invention is to include all these and other features in our trap and to provide a device essentially for areas of light beetle infestation, this device being characterized by the following new and novel features: Effectiveness in respect to capturing the Japanese beetle and other insects comparable to that of those traps mentioned in the foregoing Letters Patent, simplicity and ease of construction, ease in shipping and assembling, lightness in weight, durability, and cheapness of cost.

Our device can be assembled without the use of solder or any other similar material; it can be shipped knocked down, and it can be manufactured at a lower cost than other devices of a similar nature and usefulness.

The inclusion of these and other unique features renders the use of our device comparatively inexpensive, which is a desired feature for the more general employment of such devices by the general public.

With these and other objects in view we now give a detailed description of the various features of construction, and which are illustrated in the drawing in which Figure 1 is a side elevation of the trap; and Figure 2 is a top plan view of the trap.

In describing the invention, reference is first made to Figures 1 and 2 wherein is shown a bettle or insect container 1 consisting of an ordinary tin can, although any suitable container with a screw top may be employed. This container 1 has a screen 2 in the bottom 3 so that liquids flowing through the tapered funnel or conduit 4 may readily pass through the container. The screen 2 also permits sufficient light to enter the container so that its interior can readily be seen, thus eliminating the necessity for removal to observe whether any insects have been captured. As a conduit for the passage of beetles or insects into the container 1 there is provided a tapered funnel 4, the smaller end of which extends into the top of the beetle container 1 through an appropriate opening in the flat surface of the screw top 5. This opening is sufficiently large so that when the spreading walls of the funnel or conduit 4 come in contact with the edge of the opening in the screw top 5 the smaller opening of the tapering conduit 4 forms a tight joint at the point of contact. The funnel or conduit is firmly attached to the screw top by means of the flexible clamps 6, 7, 8 and 9 which are in part a continuation of the walls of the funnel 4 and which are bent under the screw top 5 when it is placed in proper register with the funnel 4. This method of attachment is essential for the proper nesting of the traps in shipping. The screw top 5, which is internally screw threaded as illustrated, by which it is enabled to engage the external screw threads of the insect container and to which it is attached when in use.

The baffle 10 is attached to the funnel 4 by four clamps 11, 12, 13 and 14 which are in part continuations of each wing of the baffle and which are inserted through slits 15 in the sides of the funnel or conduit 4 and bent so that a firm joint is established. This is a preferred type of construction over a removable baffle which merely rests in the funnel and which can be readily removed by wind or other action. The baffle 10 extends into the funnel 4 for approximately one-third of its length and upward for approximately two-thirds of its length, which is a preferred position.

The cross baffle 10 is composed of two plates 25 and 26 patterned as shown in Figure 2 of the drawing. These plates are made to form a cross baffle by bending them at right angles as indicated in Figure 2 and placing the plates adjacent each other so that the wings or sides of the angular plates extend outwardly at equal distances apart. That is to say the edges of the plates formed by the angles are in contact with each other on a common axis. Recessed opening 16 is cut in each plate before bending to provide a location for bait.

No separate structure is needed for the bait container, as the attractive material is placed in the opening or slot 16 which is provided by the manner in which the baffle is constructed. A cake of material such as pumice 17 and of appropriate size may be impregnated with an attractant such as is described in Letters Patent of the United States No. 1,572,568, dated February 9, 1926. This cake may be placed in the slot 16 and held in this position by the four ears 18, 19, 20, and 21 which are extensions of the baffle 10 and project inwardly into the opening or slot 16.

The wings of the baffle 10 are held together at the end away from the funnel 4 by means of a hook 22 which is inserted through the holes 23 and 24 in the top of the baffle 10. This hook not only joins the wings of the baffle 10 but it also provides a means of supporting the trap from a standard which is essential for its intended function of capturing insects.

While we have described and illustrated the preferred form of our invention, it is apparent that minor variations are possible in the construction without departing from its purpose or the scope of the appended claims.

Having fully disclosed our invention we claim:

1. An insect trap comprising an insect container having a screened bottom and a perforated removable cover, a downwardly tapering conduit extending upwardly from said container and downwardly through the perforation in the cover in close contact therewith, and having apertures in its walls near the top thereof and flexible clamps formed integral with and at the bottom of the conduit for removably securing the conduit to the cover, a plurality of angular plates projecting upwardly from said conduit, said angular plates being positioned so that their edges formed by the angles are adjacent each other back to back whereby a cross baffle is formed in and above the conduit and having flexible clamps formed integral therewith near the bottom thereof adapted to enter the apertures in the wall of the conduit for removably attaching the angular plates to the conduit in such position, said plates also having perforations in their angles near the top thereof, an open space intermediate said plates to receive an insect attractant and means to sustain said attractant in such open space.

2. An insect trap comprising an insect container having a screened bottom and a perforated removable cover, a downwardly tapering conduit projecting upwardly from the container through the perforation in the cover, means for removably attaching the conduit to the cover, a plurality of separable angular plates projecting upwardly from the conduit, said angular plates being positioned with their edges, formed by the converging sides of the plates adjacent each other back to back, whereby a cross baffle is formed in and above the conduit, means for removably attaching the angular plates to the conduit in such position, an open space intermediate said plates to receive an insect attractant and means to sustain such attractant in the open space.

DONALD E. ARMSTRONG.
FREDERICK W. METZGER.